(12) United States Patent
Ohyama et al.

(10) Patent No.: US 6,547,024 B2
(45) Date of Patent: Apr. 15, 2003

(54) REAR WHEEL SUSPENSION STRUCTURE IN MOTORCYCLE

(75) Inventors: Takashi Ohyama, Saitama (JP); Chikashi Iizuka, Saitama (JP); Shinji Kuga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,544

(22) Filed: Sep. 6, 2001

(65) Prior Publication Data

US 2002/0033296 A1 Mar. 21, 2002

(51) Int. Cl.[7] .............................................. B62D 61/02
(52) U.S. Cl. ....................................... 180/227; 180/219
(58) Field of Search .................................. 180/227, 219, 180/218, 286; 280/277, 284, 285

(56) References Cited

U.S. PATENT DOCUMENTS

| | | | | |
|---|---|---|---|---|
| 3,966,006 A | * | 6/1976 | Cullinan | 180/32 |
| 4,540,062 A | * | 9/1985 | Kashiwai | 180/227 |
| 4,697,664 A | * | 10/1987 | Kohyama | 180/226 |
| 4,782,908 A | * | 11/1988 | Trema | 180/227 |
| 4,813,697 A | * | 3/1989 | Takada | 280/284 |
| 5,531,289 A | * | 7/1996 | Muramatsu | 180/227 |
| 5,960,902 A | * | 10/1999 | Mancini et al. | 180/227 |
| 6,199,651 B1 | * | 3/2001 | Gay | 180/220 |

FOREIGN PATENT DOCUMENTS

JP  11-301563 A  2/1999

* cited by examiner

Primary Examiner—Lesley D. Morris
Assistant Examiner—Tony Winner
(74) Attorney, Agent, or Firm—Birch, Stewart, Kolasch & Birch, LLP

(57) ABSTRACT

A motorcycle includes an engine mounted on a frame in a non-swingable manner. First and second rear arms are swingably supported by the engine about first and second coaxial swing axes, respectively. A rear wheel is rotatably supported between the first and second rear arms. The second rear arm includes front and rear arm members, which are supported swingably by the engine and support an axle of the rear wheel, respectively. The arm members are separably connected together to facilitate servicing and removal of the rear wheel.

20 Claims, 6 Drawing Sheets

REAR WHEEL SUSPENSION STRUCTURE IN MOTORCYCLE

BACKGROUND OF THE INVENTION

1. Field of the Invention

The present invention relates to a motorcycle in which a rear wheel is rotatably supported by a pair of rear arms. In particular, the present invention concerns a rear wheel suspension structure for suspending a rear wheel.

2. Description of the Relevant Art

Japanese Patent Laid-open No. 301563/1999 discloses a motorcycle in which a rear wheel is rotatably supported by a pair of rear arms. The rear arms are vertically swingably supported by an engine body. In this known motorcycle, both rear arms are constructed as a unitary member from their front portions, supported by the engine body, to their rear portions, which support the rear wheel.

This known rear suspension system for the rear wheel of a motorcycle has drawbacks. When service work is to be performed, such as the replacement of a rear wheel tire, an axle inserted through the rear wheel must be extracted or pulled out, before the rear wheel is removed. Therefore, when the rear wheel is to be reinstalled, it is necessary to establish and hold a raise position of the rear wheel between both rear arms. While holding the rear wheel between the two rear arms, the is axle inserted through one of the rear arms, then the rear wheel, and then the other rear arm to mount the rear wheel. Holding and properly aligning the rear wheel is difficult and therefore servicing performance is poor.

It is possible to avoid removing the axle by removing the whole of the second rear arm. The second rear arm is vertically pivotably supported by the engine body. Therefore, in this case it is necessary to take some measure for preventing the adhesion of dust to a bearing portion of the second rear arm. Therefore, removal of the whole of the second rear arm should be avoided in servicing the rear wheel.

SUMMARY OF THE INVENTION

It is an object of the present invention to address one or more of the drawbacks associated with the background art.

It is an object of the invention is to provide a rear wheel suspension structure, for a vehicle, such as a motorcycle, which is capable of improving the rear wheel servicing performance while eliminating the need of considering a measure against the adhesion of dust to the bearing portion of the second rear arm when servicing the rear wheel.

These and other objects are accomplished by a motorcycle in which an engine body of an engine is mounted on a body frame non-swingably and a rear wheel is disposed between and supported rotatably by a first rear arm and a second rear arm. The first rear arm is vertically swingably supported by the engine body and forms a part of a case which incorporates a power train system for transmitting power from the engine to the rear wheel. The second rear arm is vertically swingably supported by the engine body about an axis which is coaxial with a swing axis of the first rear arm. The second rear arm includes a plurality of arm members, including a front arm member supported swingably by the engine body and a rear arm member which supports the axle of the rear wheel rotatably. The plural arm members are connected together so that they can be disconnected from each other.

With this configuration, by separating the rear arm member out of the components of the second rear arm, the rear wheel can be removed sideways on the side opposite to the first rear arm without pulling out the axle. Also, at the time of mounting of the rear wheel all that is required is merely passing the axle as supported on the first rear arm side through the rear wheel and mounting the rear arm member. Therefore, the rear wheel servicing performance can be improved in comparison with the conventional structure in which the axle is passed through the rear wheel which must be raised and held in an established position.

Further, in the present invention, the portion of the second rear arm where the second rear arm is supported by the engine body is not disassembled in servicing the rear wheel. Therefore, there is no fear of dust adhesion to the bearing portion of the second rear arm. Thus, it is not necessary to consider taking any measure against the adhesion of dust.

According to the present invention, there is provided a rear wheel suspension structure wherein the front arm member is connected separably to the first rear arm between the engine body and the rear wheel. The rear arm member is connected separably to the front arm member while maintaining the connected state of the front arm member to the first rear arm. With this configuration, the rear wheel can be removed outwardly sideways without disassembling the connection between the first and second rear arms, thus preventing the occurrence of twist relative to both rear arms which are connected together between the engine body and the rear wheel. Therefore, the rear wheel servicing performance can be further improved.

According to the present invention, there is provided a rear wheel suspension structure wherein the axle of the rear wheel and a final output shaft of the power train system are contiguous to each other coaxially and integrally. With this configuration, the final output shaft of the power train system also serves as the rear wheel axle. Therefore, the construction of the power train system can be simplified.

Further, according to the present invention, there is provided a rear wheel suspension structure wherein in the rear arm, the front arm member is connected separably to the rear arm member which is capable of being connected separably to the first rear arm between the engine body and the rear wheel. With this configuration, by subassembling the rear arm member in the second rear arm, the first rear arm connected to the rear arm member, and the rear wheel supported through the axle by the rear arm member and the first rear arm, and by mounting the first rear arm to the engine body, mounting the front arm member which constitutes a part of the second rear arm and connecting it to the rear arm member, both rear arms which support the rear wheel through the axle can be installed to the engine body. Therefore, the rear wheel installing performance can be improved.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
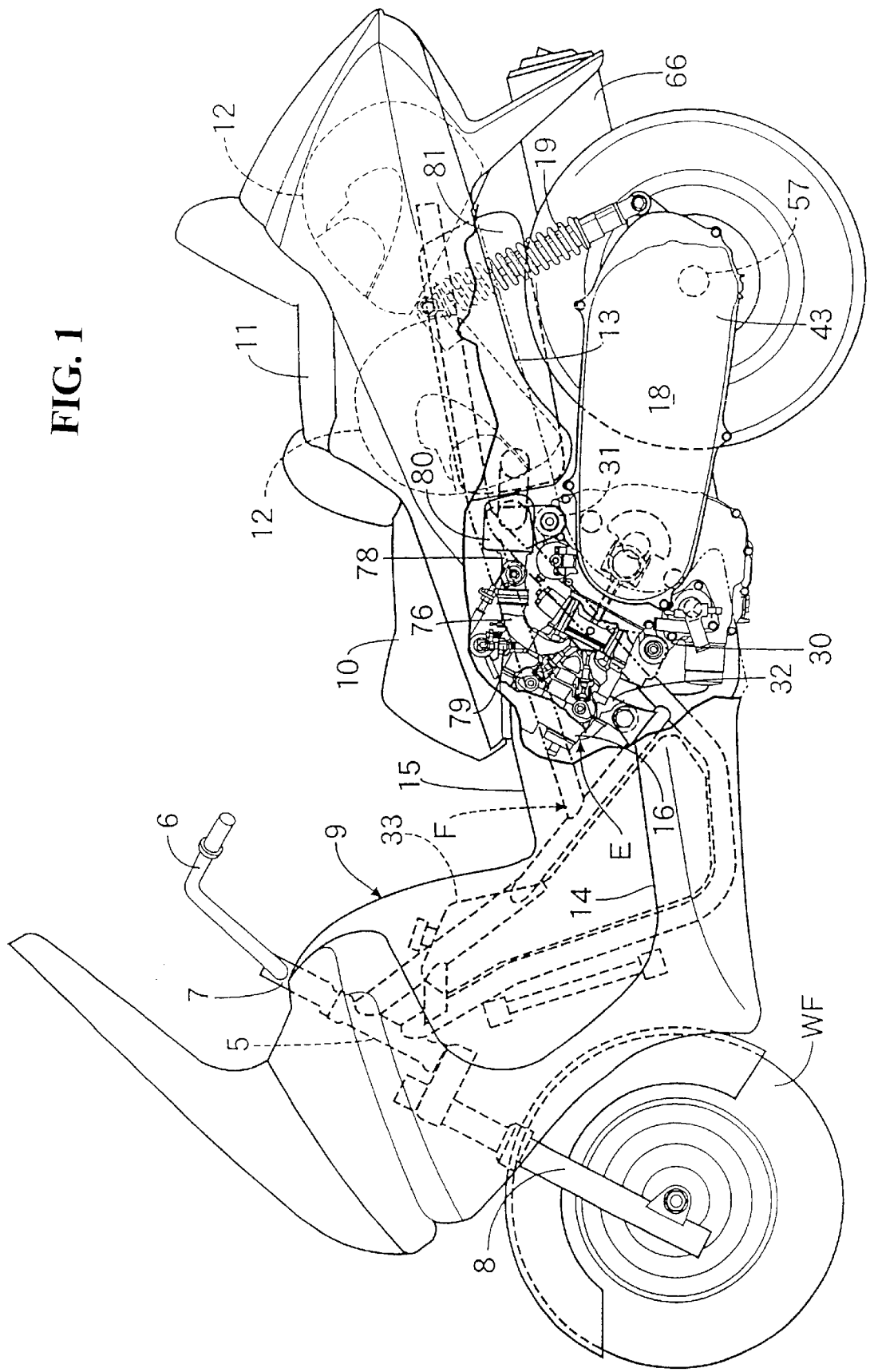
FIG. 1 is a partially cut-away side view of a scooter type motorcycle, according to the present invention.

FIGS. 1 to 4 illustrate a first embodiment of the present invention. In FIG. 1, a head pipe 5 is disposed at a front end of a body frame F of the scooter type motorcycle. A steering shaft 7, with a steering handle 6 provided at an upper end thereof, is steerably supported by the head pipe 5. A front fork 8 is connected to a lower end of the steering shaft 7. A front wheel WF is rotatably supported by a lower portion of the front fork 8.

The body frame F is covered with a cover 9. Behind the cover 9, are mounted a main seat 10 for a rider and a pillion seat 11 for a fellow passenger. The pillion seat 11 is located behind the main seat 10. The pillion seat 11 is attached to the cover 9 so that it can be opened and closed. A container box 13 for receiving a pair of helmets 12, etc. is mounted to a rear portion of the body frame F so that an upper-end opening thereof can be closed with the pillion seat 11.

The cover 9 is provided with a pair of right and left step floors 14 for the rider sitting on the main seat 10 to put his or her feet thereon. The cover 9 is also provided with a floor tunnel cover 15, which is raised upward between the step floors 14.

Figure 2:
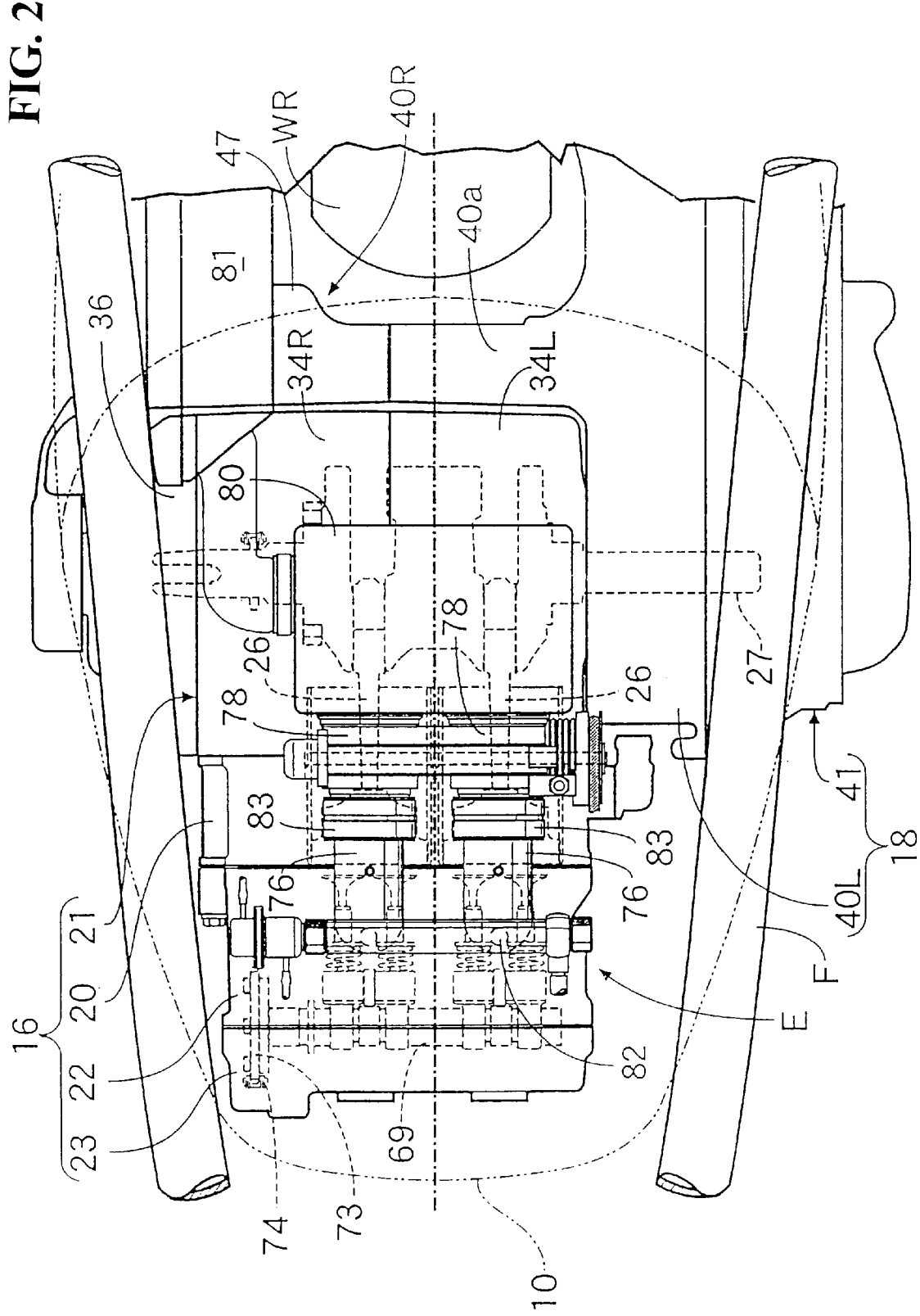
FIG. 2 is an overhead view of an engine with a seat omitted.
Figure 3:
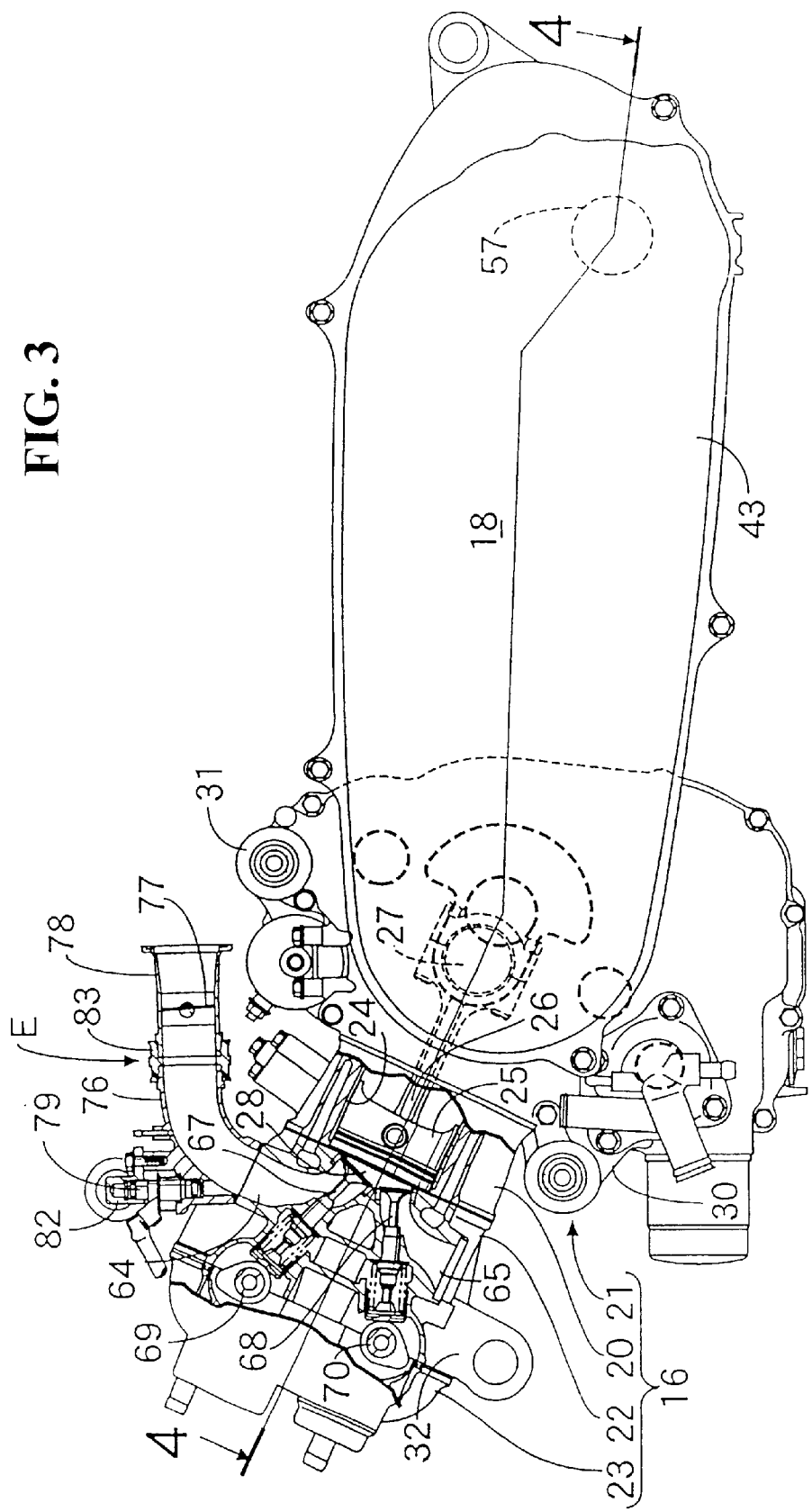
FIG. 3 is a partially cut-away side view of an engine body and a case.
Figure 4:
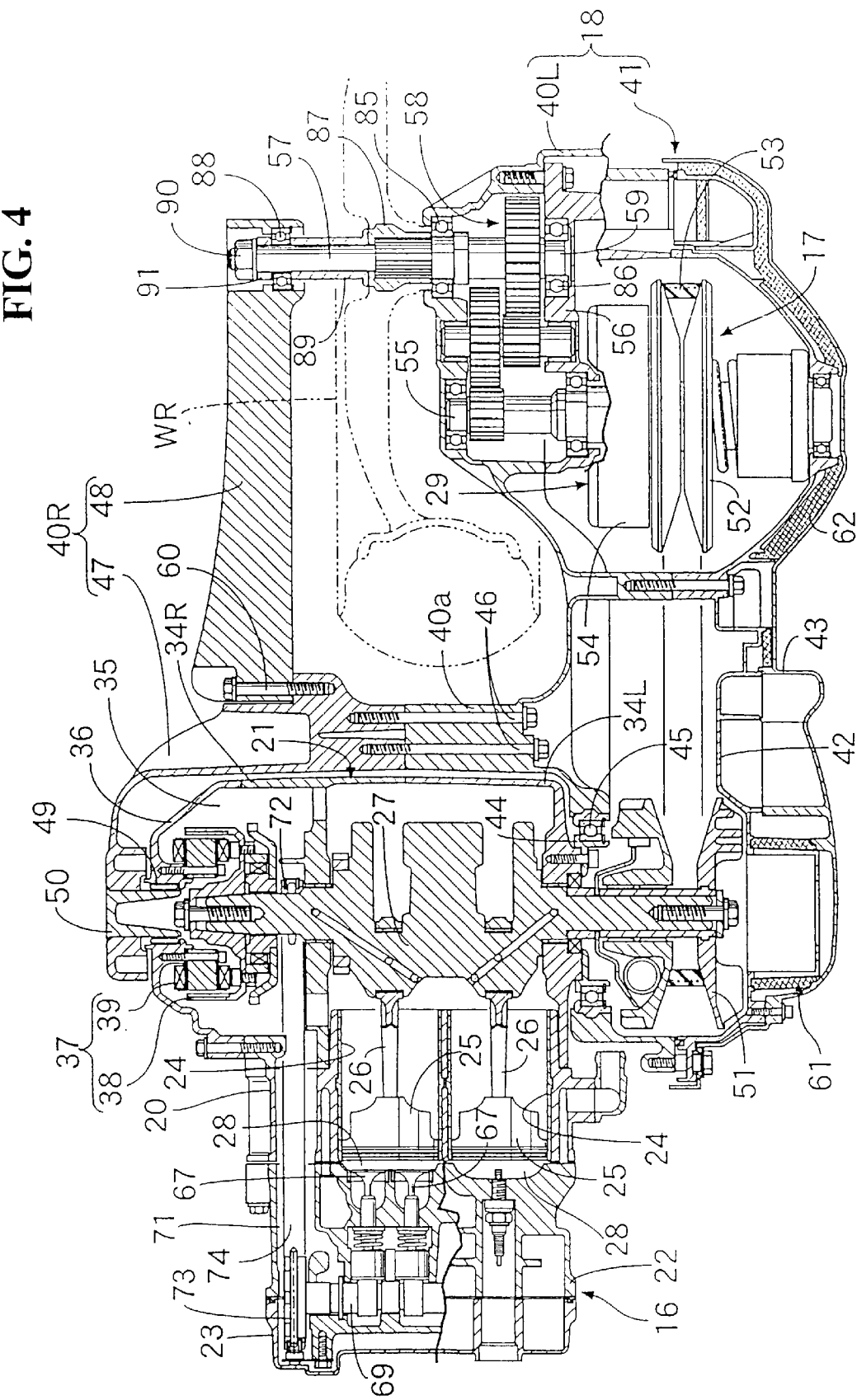
FIG. 4 is a cross sectional view taken along line 4—4 in FIG. 3.

Referring also to FIGS. 2 to 4, an engine body 16 of an engine E is non-swingably supported by the body frame F below the main seat 10. The engine E may be a two-cylinder engine or other type of engine. The engine body 16 includes a cylinder block 20 having a pair of cylinder bores 24 which are parallel to each other.

The engine body 16 also includes a crankcase 21, which rotatably supports a crankshaft 27, and a cylinder block 20. The crankshaft is connected through a pair of connecting rods 26 to a pair of pistons 25, which are slidably fitted in the cylinder bores 24 respectively. A cylinder head 22 is coupled to the cylinder block 20 in such a manner that a pair of combustion chambers 28, to which the pistons 25 face, are formed between the cylinder head and the cylinder block. Further, a head cover 23 is coupled to the cylinder head 22 on the side opposite to the cylinder block 20.

Support arm portions 30 and 31 are provided in a front lower portion and a rear upper portion, respectively, of the crankcase 21. Further, a support arm portion 32 is provided in a lower portion of the cylinder head 22. The support arm portions 30, 31, 32 are connected to the body frame F, whereby the engine body 16 is supported by the body frame F in a non-swingably manner. When the engine body 16 is so supported by the body frame F, the engine body 16 assumes a posture in which the axes of the paired cylinder bores 24 arranged in the transverse direction of the body frame F are inclined forwardly and upwardly.

Since the engine body 16 is supported by the body frame F while the axes of the cylinder bores 24 are inclined forwardly and upwardly, an empty space is formed in front of the engine body 16. A fuel tank 33 is mounted to a front portion of the body frame F in such a manner that a rear portion thereof is located within the said empty space.

The crankcase 21 comprises left and right crankcase halves 34L, 34R coupled together. A case cover 36 is fastened to the right crankcase half 34R so as to define a generator chamber 35 between the right crankcase half 34R and the same. Within the generator chamber 35, an outer rotor 38 is fixed to the crankshaft 27 and an inner stator 39, which constitutes an AC generator 37 in cooperation with the outer rotor 38, is fixed to the case cover 36.

A front portion of a first rear arm 40L is disposed on the left-hand side of the rear wheel WR. A front portion of a second rear arm 40R is disposed on the right-hand side of the rear wheel WR. The front portions of the first and second rear arms 40L, 40R are supported by the crankcase 21 in the engine body 16 so as to be vertically swingably about an axis coaxial with the axis of the crankshaft 27. The rear wheel WR is supported between the rear arms 40L and 40R through an axle.

The first rear arm 40L forms a part of a case 18, which incorporates a power train system 29 for transmitting power from the engine E to the rear wheel WR. The case 18 is constituted by both the first rear arm 40L and a cover 41, which covers the first rear arm from outside. The cover 41 is provided with a cover inner wall 42 fastened to the first rear arm 40L and a cover outer wall 43 which is fastened to the cover inner wall 42 so as to provide a spacing between an outer surface of the cover inner wall 42 and the same. Further, a rear cushion or shock absorber 19 is disposed between a rear portion of the case 18 and the body frame F.

A ring-like support member 44 is fastened to an outer surface of the left case halve 34L of the crankcase 21 so as to coaxially surround the crankshaft 27. The crankshaft 27 extends rotatably through the left case half 34L into the case 18. The front portion of the first rear arm 40L is rotatably supported by the support member 44 through a ball bearing 45.

The second rear arm 40R is made up of a front arm member 47 which is vertically swingably supported by the crankcase 21 in the engine body 16 and a rear arm member 48. The rear arm member is connected to the front arm member 47 separably. Between the rear arm member 48, which supports the rear wheel WR through the axle and the body frame F, is mounted a rear cushion or shock absorber of the same structure as the rear cushion 19 disposed between the rear portion of the case 18 and the body frame F.

The front arm member 47 is formed so as to extend sideways of the case cover 36 and lap on the back side of the crankcase 21 curvilinearly. A pivot shaft 50, coaxial with the crankshaft 27 and connected to a front portion of the front arm member 47, is rotatably supported by the case cover 36 through a roller bearing 49.

A connection 40a lapping on the back side of the crankcase 21, is integral with the first rear arm 40L and the front arm member 47 of the first rear arm 40R is fastened to the connection 40a with bolts 46. Thus, the front arm member 47 of the second rear arm 40R is separably connected to the first rear arm 40L between the engine body 16 and the rear wheel WR. In other words, the first and second rear arms 40L, 40R are interconnected between the engine body 16 and the rear wheel WR and are thereby supported by the engine body 16 so as to be vertically swingably about an axis coaxial with the crankshaft 27 while preventing the occurrence of twist of both rear arms.

The rear arm member 48 of the second rear arm 40R is connected to the front arm member 47 by a plural bolts 60. Therefore, the rear arm member 48 is separable from the front arm member 47, while allowing the front arm member 47 to remain connected to the engine body 16 and to the first rear arm 40L.

The power train system 29 includes a transmission 17 and reduction gear train 58. The transmission 17 shifts the power of the crankshaft 27 in a stepless manner. The reduction gear train 58 decelerates the output of the transmission 17 and transmits the thus-reduced output to the rear wheel WR.

The transmission 17 is a conventional, known belt type transmission. In the transmission 17, an endless belt 53 is wound on both a driving pulley 51, mounted on the crankshaft 27, and a driven pulley 52, connected to an output shaft 55 through a centrifugal clutch 54. With an increase in the number of revolutions of the crankshaft 27, an effective radius of the driving pulley 51 increases and that of the driven pulley 52 decreases. By this arrangement, a gear ratio can be shifted from a LOW ratio to a TOP ratio in a stepless manner.

Within the case 18, a support wall 56 is fastened to the first rear arm 40L. The output shaft 55 of the transmission 17 is supported rotatably by both the first rear arm 40L and the support wall 56. The reduction gear train 58 is disposed between the output shaft 55 of the transmission 27 and a final output end, i.e. a final output shaft 59 of the power train system 29. The reduction gear train 58 is accommodated between the first rear arm 40L and the support wall 56.

The final output shaft 59 is supported supported by the first rear arm 40L through a ball bearing 85 and also by the support wall 56 through a ball bearing 86. An axle 57 is contiguous to the final output shaft 59 coaxially and integrally.

The axle 57 extends through a hub 87 of the rear wheel WR. Both the axle 57 and the hub 87 are splined to each other to prevent a relative rotation. The axle 57 is rotatably supported by the rear arm member 48 in the second rear arm 40R through a ball bearing 88. A cylindrical spacer 89, which surrounds the axle 57, is interposed between an inner ring of the ball bearing 88, positioned on the rear arm member 48 side, and an inner ring of the ball bearing 85 positioned on the first rear arm 40L side.

A nut 90 is threadedly engaged with an outer end portion of the axle 57 at an outer position with respect to the ball bearing 88. A ring plate 91 is interposed between the nut and the inner ring of the ball bearing 88. As the nut 90 is tightened, the hub 87 of the rear wheel WR and the spacer 89 are sandwiched in between the inner rings of the ball bearings 85 and 88. When the nut 90 is loosened, and the bolts 60 are loosened to disconnect the rear arm member 48 from the front arm member 47, it is possible to remove the rear arm member 48 outwardly sideways along the axis of the axle 57. Further, it is possible to remove the spacer 89 and the rear wheel WR outwardly sideways along the axis of the axle 57. With reference to FIG. 4, the position of the connection between the front and rear arm members 47 and 48 is positioned so that the front arm member 47 is not an obstacle to the removal of the rear wheel WR.

An air cooler 61 is disposed in a front portion of the case 18. The air cleaner 61 is disposed between the cover inner wall 42 and the cover outer wall 43. The air cooler 61 passes air for cooling the belt type transmission 17 from the exterior of the transmission case 18 to the interior thereof.

A sound absorbing material 62 is sandwiched in between the cover inner wall 42 and the cover outer wall 43 in a rear portion of the case 18. Thus, cover 41 in the rear portion of the case 18 is constructed so as to have a soundproofing structure.

In the cylinder head 22 of the engine body 16 are formed intake ports 64. The intake ports 64 are open obliquely upwardly and correspondingly each individually to the combustion chambers 28. In the cylinder head 22 are also formed exhaust ports 65 so as to be open downwardly and correspondingly each individually to the combustion chambers 28. Further, an exhaust system, which includes an exhaust muffler 66 (see FIG. 1), is disposed on the right-hand side of the rear wheel WR. The exhaust system is connected to both exhaust ports 65.

Intake valves 67 for opening and closing between the intake ports 64 and the combustion chambers 28 are disposed in the cylinder head 22 in a pair for each combustion chamber 28. Likewise, exhaust valves 68 for opening and closing between the exhaust ports 6 and the combustion chambers 28 are disposed in a pair for each combustion chamber 28.

An intake-side cam shaft 69 for opening and closing the intake valves 67 and an exhaust-side cam shaft 70 for opening and closing the exhaust valves 68 are supported in the cylinder head 22 so that their axes are parallel to the crankshaft 27. A chain chamber 71 in which first ends of the cam shafts 69 and 70 face is formed through the crankcase 21, cylinder block 20, cylinder head 22 and head cover 23 so as to communicate with the generator chamber 35. A driving sprocket 72 is integrally provided on the crankshaft 27 at a portion corresponding to the chain chamber 71. An endless timing chain 74 adapted to travel within the chain chamber 71 is wound on a driven sprocket 73 fixed to the first end of the intake-side cam shaft 70, a driven sprocket (not shown) fixed to the first end of the exhaust-side cam shaft 71, and the driving sprocket 72.

A pair of throttle bodies 78 are each provided with a throttle valve 77. The throttle bodies 78 have substantially parallel axes below the main seat 10. Upstream ends of a pair of intake pipes 76 are connected to downstream ends of the throttle bodies 78 through connecting hoses 83. Downstream ends of the intake pipes 76 are connected to the intake ports 64 in the cylinder head 22.

Each intake pipe 76 includes a rear portion extending substantially horizontally forward from the associated throttle body 78 having a substantially horizontal axis and a front portion communicating with the associated intake port 64 and extending obliquely backward. The rear and front portions are contiguous to each other through a curved portion. A pair of fuel injection valves 79, which are covered from above with the main seat 10, are attached to the curved portions of the intake pipes 76 respectively in a posture which permits direct injection of fuel toward the intake valves 67. Rear ends of the fuel injection valves 79 are connected in common to a fuel rail 82.

Upstream ends of the throttle bodies 78 are connected in common to an intake chamber 80 disposed in front of the container box 13. The intake chamber 80 is connected to an air cleaner 81 which is disposed on the right-hand side of the container box 13, namely, on the right-hand side of the rear wheel WR, and above the exhaust muffler 66. The exhaust muffler 66 and the air cleaner 81 are disposed without swinging motion, on the right-hand side of the rear wheels WR. This arrangement allows a wide space which permits swinging motion of the case 18 of the transmission 17 on the left-hand side of the rear wheel WR. Further, this arrangement ensures that space is available for the required capacities of the exhaust muffler 66 and air cleaner 81.

Next, the operation of the first embodiment will now be described. Since the engine body 16 of the engine E is supported by the body frame F in a non-swingably manner, the intake system of the engine E does not swing. This means that the throttle bodies 78 having generally horizontal axes below the main seat, intake pipes 76 connecting between the intake ports 64 in the engine body 16 and the throttle bodies 78, fuel injection valves 79 attached to the intake pipes 76, intake body 80, and air cleaner 81 do not swing. Consequently, it is not necessary to provide a space for permitting a swinging motion of the intake system between the engine body 16 and the main seat 10. This arrangement permits the height of the main seat 10 to be set low.

Moreover, cables associated with the throttle valves 79 in the throttle bodies 78 and hoses associated with the fuel injection valves 79 do not swing. Therefore, it is possible to improve the durability of those components. Further, since the fuel injection valves 79, attached to the intake pipes 76, are covered from above with the main seat 10, an operational striking sound of the fuel injection valves 79 can be absorbed by the main seat 10. This arrangement results in a sound deadening effect against such striking sounds.

Since the engine body 16 is supported by the body frame F in a state in which the axes of the paired cylinder bores 24 are inclined forwardly and upwardly, a space for disposing therein a rear portion of an auxiliary device, e.g. a fuel tank 33, can be provided. This arrangement avoids an increase in a size of the scooter type motorcycle. Further, since both cylinder bores 24 are formed in the engine body 16 so as to be arranged in the transverse direction of the body frame F, it is possible to attain a large displacement of the engine E while avoiding an increase in height of the main seat 10.

The case 18 is supported swingably by the crankcase 21 of the engine body 16. Since the swing axis of the case 18 is coaxial with the axis of the driving pulley 51 in the transmission 17, which is a belt type continuously variable transmission, i.e. coaxial with the axis of the crankshaft 27, a swing motion of the case 18 does not exert an excessive load on the endless belt 53 of the transmission 17.

The rear wheel WR is supported rotatably by the first and second rear arms 40L, 40R. The first and second rear arms are disposed on both sides of the rear wheel, and are vertically swingably supported by the engine body 16. The second rear arm 40R includes the front arm member 47 supported swingably by the engine body 16 and the rear arm member 48 separably connected to the front arm member 47. The axle 57 of the rear wheel WR is supported rotatably by the rear arm member 48.

By disconnecting the rear arm member 48 from the front arm member 47, the second rear arm 40R is divided in the back and forth direction. The rear wheel WR can be removed sideways on the side opposite to the first rear arm 40L. When mounting the rear wheel WR, all that is required is merely moving the rear wheel WR toward the first rear arm 40L sideways from the outside, while inserting the axle as supported on one end side by the first rear arm 40L into the hub 87. Later, the rear arm member 48 is connected to the front arm member 47, and the opposite end side of the axle 57 is allowed to be supported by the rear arm member 48.

By the above arrangement, servicing of the rear wheel WR is made easier in comparison with servicing the conventional rear wheel suspending structure, in which the axle 57 is inserted through both rear arms and the rear wheel WR, while the rear wheel is established and held in its raised position.

While the rear wheel WR is subjected to servicing, the front arm member 47 of the second rear arm 40R is kept connected to the engine body 16. In other words, the supported portion of the second rear arm 40R with respect to the engine body 16 is not disassembled. Therefore, there is no fear of dust contaminating the bearing portion of the second rear arm 40R, and one need not concern oneself with taking any measure against the adhesion of dust.

The front arm member 47 in the second rear arm 40R is connected separably to the first rear arm 40L at a location between the engine body 16 and the rear wheel WR. Consequently, the first and second rear arms 40L, 40R are interconnected between the engine body 16 and the rear wheel WR and are supported by the engine body 16 to be vertically swingably about an axis coaxial with the crankshaft 27 while preventing mutual twist.

The rear arm member 48 is connected to the front arm member 47 separably while keeping the front arm member 47 connected to the first rear arm 40L. Therefore, it is possible to remove the rear wheel WR outwardly sideways without disassembling the connection of the first and second rear arms 40L and 40R. Thus, the servicing performance for the rear wheel WR is improved to a still greater extent.

The axle 57 of the rear wheel WR and the final output shaft 59 of the power train system 29, accommodated within the case 18 (a part of which is constituted by the first rear arm 40L), are contiguous to each other coaxially and integrally. By this arrangement, the construction of the power train system 29 can be simplified allowing the final output shaft 59 to serve also as the axle 57.

Figure 5:
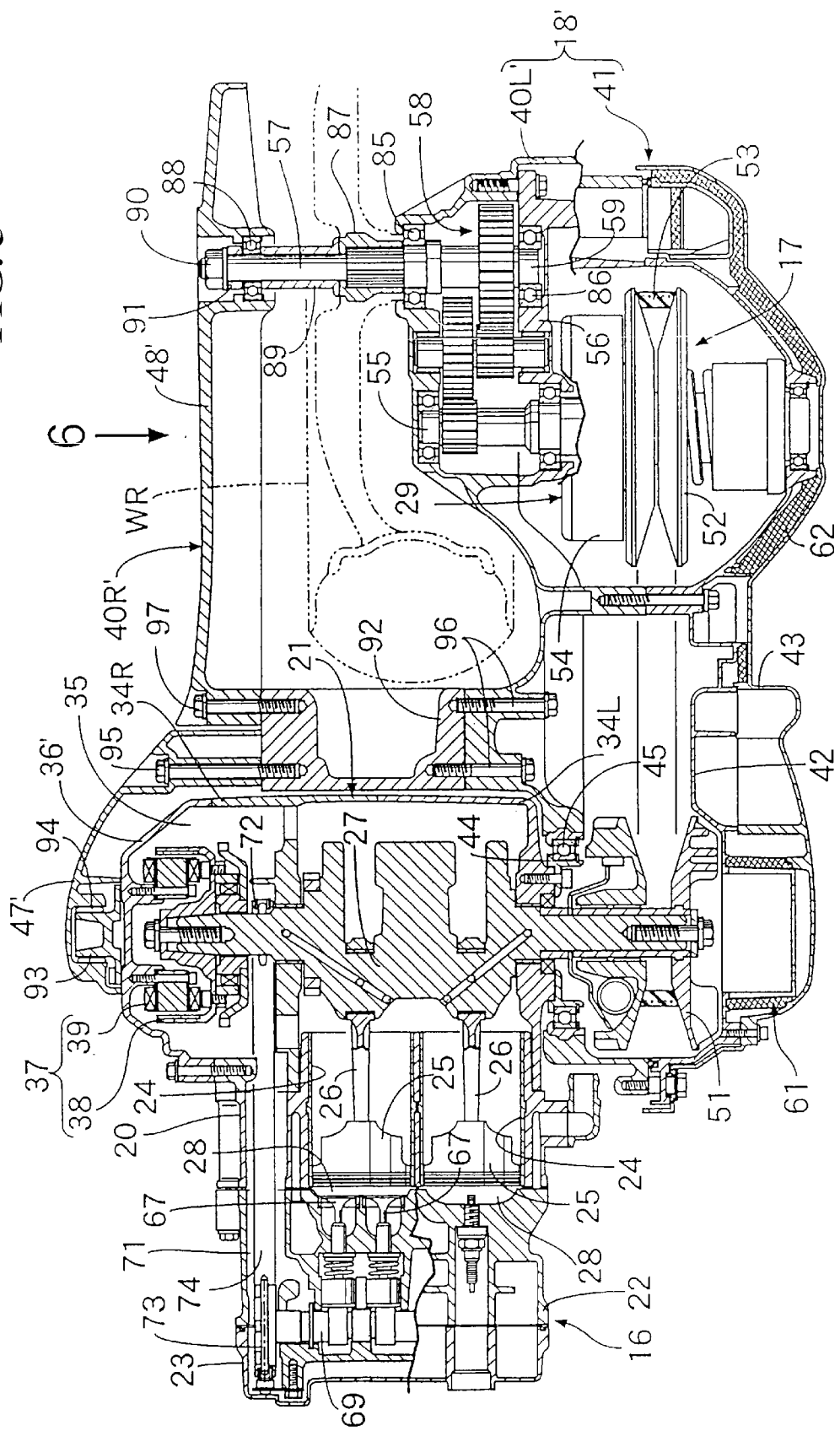
FIG. 5 is a cross sectional view, similar to FIG. 4, illustrating an engine body and case, according to alternate embodiment of the present invention.
Figure 6:
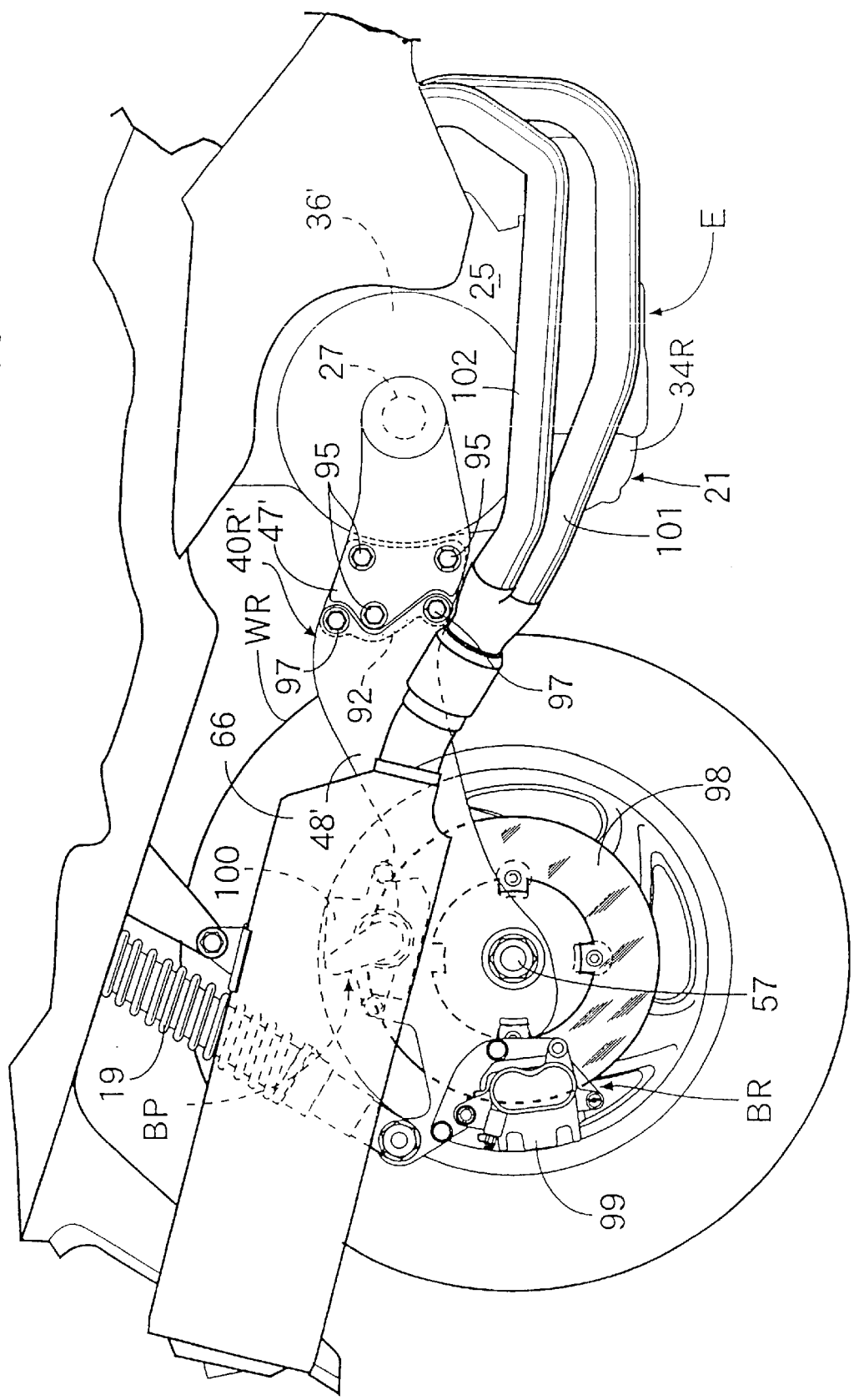
FIG. 6 is a view as seen in the direction of arrow 6 in FIG. 5.

FIGS. 5 and 6 illustrate a second embodiment of the present invention, in which the portions corresponding to the above first embodiment are identified by same reference numerals. In FIG. 5, a forward or front portion of a first rear arm 40L' is disposed on the left-hand side of a rear wheel WR. A forward or front portion of a second rear arm 40R' is disposed on the right-hand side of the rear wheel WR. The front portions are supported by a crankcase 21 in the engine body 16 so as to be vertically swingably about an axis coaxial with the axis of a crankshaft 27. The rear wheel WR is supported between rearward or rear portions of the rear arms 40L' and 40R'.

The front portion of the first rear arm 40L' is supported rotatably through a ball bearing 45 by a ring-like support member 44 which is fastened to an outer surface of a left case half 34L of the crankcase 21. A case 18' which houses a power train system 29 is constituted by both the first rear arm 40L' and a cover 41 which is fastened to the first rear arm 40L'.

The second rear arm 40R' includes a front arm member 47' which is supported vertically swingably by the crankcase 21 in the engine body 16. The second rear arm 40R' also includes an intermediate arm member 92 connected to the front arm member 47' separably, and a rear arm member 48' connected to the intermediate arm member 92 separably. A rear cushion or shock absorber 19 is disposed between the rear arm member 48' which supports the rear wheel WR through an axle and a body frame F.

To a right crankcase half 34R of the crankcase 21 is fastened a case cover 36' which forms a generator chamber 35 between the crankcase half 34R and the same. A cylindrical pivot shaft 93, coaxial with the crankshaft 27, is fastened to an outer surface of the case cover 36'.

The front arm member 47' is formed so as to extend sideways from the case cover 36' and lap on the back side of the crankcase 21, and a front portion of the front arm member 47' is supported by the pivot shaft 93 pivotably through a roller bearing 94.

The intermediate arm member 92 is disposed between the engine body 16 and the rear wheel WR. The front arm member 47' is connected separably to a right end portion of the intermediate arm member 92 with plural bolts 95.

The first rear arm 40L' is connected separably to a left end portion of the intermediate arm member 92 with plural bolts 96. Thus, the first and second rear arms 40L' and 40R' are interconnected between the engine body 16 and the rear wheel WR and are supported by the engine body 16 vertically swingably about an axis coaxial with the crankshaft 27 while preventing the occurrence of mutual twist.

The rear arm member 48' in the second rear arm 40R' is connected separably to the right end portion of the intermediate arm member 92 with plural bolts 97 independently of the front arm member 47'. Thus, the rear arm member 48' is connected separably to the intermediate arm member 92 and separably from the front arm member 47' while maintaining the connected state of the front arm member 47' to the first rear arm 40L' through the intermediate arm member 92.

A caliper body 99, which constitutes a part of a rear wheel disc brake BR, together with a brake disc 98 fixed to the rear wheel WR, is supported by the rear arm member 48 of the second rear arm 40R'. A caliper body 100, which constitutes a part of a parking brake BP together with the brake disc 98, is also supported by the rear arm member 48.

A pair of exhaust pipes 101, 102 are connected at upstream ends thereof to a lower portion of a cylinder head 22 in the engine body 16. The exhaust pipes 101, 102 extend backward while passing below and to the right-hand side of the engine body 16. Downstream ends of the exhaust pipes 101 and 102 are connected in common to an exhaust muffler 66. The exhaust muffler 66 is disposed outside the rear arm member 48' and is supported by the body frame F.

The second embodiment exhibits the same effects as in the previous first embodiment. Further, in the second embodiment, the rear wheel WR installation procedure is further enhanced. In the second embodiment, the front arm member 47' in the second rear arm 40R' is connected separably to the rear arm 48', which is separably connected to the first rear arm 40L' through the intermediate arm member 92 disposed between the engine body 16 and the rear wheel WR. Therefore, the rear arm member 48' in the second rear arm 40R', the first rear arm 40L' connected to the rear arm member 48' through the intermediate arm member 92, and the rear wheel WR supported through the axle by the rear arm member 48' and the first rear arm 40L', can be subassembled. Therefore, by mounting the first rear arm 40L' to the engine body 16 and by mounting the front arm member 47' to the engine body 16 and connecting the front arm member 47' to the rear arm member 48' through the intermediate arm member 92, both rear arms 40L' and 40R' which support the rear wheel WR through the axle can be installed to the engine body 16. Thus, the rear wheel WR installing performance can be improved.

According to the present invention, the rear wheel can be removed sideways on the side opposite to the first rear arm. Also, at the time of mounting the rear wheel, it suffices to pass the axle as supported on the first rear arm side through the rear wheel and install the rear arm member. Thus, it is possible to improve the rear wheel servicing performance. Since it is not necessary that the whole of the second rear arm is removed, and there is no fear of dust adhesion to the bearing portion of the second rear arm, it is not necessary to consider any measure against the adhesion of dust.

According to the present invention, the first and second rear arms are interconnected between the engine body and the rear wheels. Therefore, it is possible to prevent the occurrence of twist between both rear arms. At the same time, the rear wheel can be removed outwardly sideways without disassembling the interconnection. Therefore, the rear wheel servicing performance can be further improved.

According to the present invention, by allowing the final output shaft in the power train system to serve also as the axle of the rear wheel, the construction of the power train system can be simplified.

Further, according to the present invention, the rear arm member in the second rear arm, the first rear arm connected to the rear arm member, and the rear wheel supported through the axle by the rear arm member and the first rear arm, can be subassembled. Therefore, both rear arms which support the rear wheel through the axle can be installed easily to the engine body, and thus it is possible to improve the rear wheel installing performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vehicle comprising:
    a frame;
    an engine mounted on said frame;
    a first rear arm which is swingable relative to said frame, said first rear arm extending toward a rear end of said vehicle;
    a second rear arm which is swingable relative to said frame, said second rear arm extending toward the rear end of said vehicle; and
    a rear wheel is disposed between and rotatably supported by said first rear arm and said second rear arm, wherein said second rear arm includes a plurality of arm members, including a forward arm member and a rearward arm member which are removably connected together.

2. The vehicle according to claim 1, wherein said engine is mounted on said frame in a non-swingably manner.

3. The vehicle according to claim 2, wherein said first rear arm is connected to a body of said engine in a swingable manner.

4. The vehicle according to claim 3, wherein said second rear arm is connected to said body of said engine in a swingable manner.

5. The vehicle according to claim 4, wherein said first rear arm is swingable about a first swing axis and wherein said second rear arm is swingable about a second swing axis, which is coaxial with said first swing axis of said first rear arm.

6. The vehicle according to claim 5, wherein said first swing axis and said second swing axis are approximately horizontal, such that said first and second rear arms may swing in an approximately vertical directions.

7. The vehicle according to claim 1, wherein said forward arm member of said second rear arm is swingably connected to said engine, and wherein said rearward arm member of said second rear arm supports an axle of said rear wheel.

8. The vehicle according to claim 1, further comprising:
    a power train system for transmitting power from said engine to said rear wheel, wherein said first rear arm forms at least a part of a case for housing said power train system.

9. The vehicle according to claim 8, wherein said power train system includes a final output shaft, and wherein an axle of said rear wheel and said final output shaft of said power train system are coaxial.

10. The vehicle according to claim 9, wherein said axle of said rear wheel and said final output shaft of said power train system are integrally formed.

11. The vehicle according to claim 1, wherein said vehicle is one of a motorcycle, a motor scooter, an all-terrain vehicle, and a mini-bike.

12. The vehicle according to claim 1, wherein said first rear arm is separably connected to said second rear arm, such that said first rear arm moves in unison with said second rear arm.

13. The vehicle according to claim 12, wherein said first rear arm is separably connected to said second rear arm at a location between said engine and said rear wheel.

14. The vehicle according to claim 12, wherein said forward arm member is separably connected to said first rear arm, such that said rearward arm member may be removed from said forward arm member, while said forward arm member remains separably connected to said first rear arm.

15. The vehicle according to claim 12, wherein said forward arm member is separably connected to said first rear arm and said rearward arm member is separably connected to said first rear arm, such that said rearward arm member may be removed from said forward arm member and said first rear arm, while said forward arm member remains separably connected to said first rear arm.

16. The vehicle according to claim 15, wherein said rearward arm member is separably connected to said forward arm member and said first rear arm at locations located between said engine and said rear wheel.

17. The vehicle according to claim 12, wherein said first rear arm is separably connected to said second rear arm via an intermediate arm member.

18. A rear suspension system for a vehicle including a frame and an engine mounted on the frame, said rear suspension system comprising:

a first rear arm adapted to be swingably mounted relative to the frame; and a second rear arm adapted to be swingably mounted relative to the frame, said second rear arm including a plurality of arm members, including a forward arm member and a rearward arm member which are removably connected together, wherein said first rear arm and said second rear arm are adapted to rotatably support a rear wheel.

19. The rear suspension system according to claim 18, wherein said first rear arm is adapted to be connected to a body of the engine in a swingable manner and said second rear arm is adapted to be connected to the body of the engine in a swingable manner.

20. The rear suspension system according to claim 18, wherein said forward arm member of said second rear arm is adapted to be swingably connected to the engine, and wherein said rearward arm member of said second rear arm is adapted to support an axle of the rear wheel.

* * * * *